US009767273B2

(12) United States Patent
van Riel et al.

(10) Patent No.: US 9,767,273 B2

(45) Date of Patent: Sep. 19, 2017

(54) RELIABLY TERMINATING PROCESSES IN A SYSTEM WITH CONFINED EXECUTION ENVIRONMENTS

(75) Inventors: Henri H. van Riel, Nashua, NH (US); Daniel J. Walsh, Marlborough, MA (US); Warren I. Togami, Jr., Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 1275 days.

(21) Appl. No.: 12/324,679

(22) Filed: Nov. 26, 2008

(65) Prior Publication Data

US 2010/0132013 A1 May 27, 2010

(51) Int. Cl.

*G06F 17/00* (2006.01)
*H04L 29/06* (2006.01)
*G06F 21/53* (2013.01)

(52) U.S. Cl.

CPC .................................... *G06F 21/53* (2013.01)

(58) Field of Classification Search

CPC ... G06F 21/56; G06F 21/564; H04L 63/1416; H04L 63/1408; H04L 63/1441; H04L 63/1458; F41H 13/00; F41H 13/0093
USPC ............................ 726/1–3, 22; 713/153–154
See application file for complete search history.

(56) References Cited

U.S. PATENT DOCUMENTS 5,701,458 A 12/1997 Bsaibes et al.
6,189,019 B1 2/2001 Blumer et al.
7,069,437 B2 6/2006 Williams
7,089,584 B1 8/2006 Sharma
7,437,718 B2 10/2008 Fournet et al.
7,475,423 B2 1/2009 Jooste
7,505,976 B2 3/2009 Kudo
7,614,085 B2 11/2009 Ben-Itzhak
7,698,731 B2 4/2010 Johnson et al.
7,712,143 B2 5/2010 Comlekoglu
7,904,474 B2 3/2011 Rowley
8,108,937 B1 1/2012 Sallam
8,261,345 B2 9/2012 Hitomi et al.
8,312,043 B2 11/2012 van Riel et al.
8,479,256 B2 7/2013 van Riel et al.
2002/0186260 A1 12/2002 Young
2003/0172109 A1 * 9/2003 Dalton .................... G06F 9/468
709/203

(Continued)

OTHER PUBLICATIONS

USPTO Notice of Allowance for U.S. Appl. No. 12/324,643, mailed Jul. 11, 2012.

(Continued)

*Primary Examiner* — Evans Desrosiers
(74) *Attorney, Agent, or Firm* — Lowenstein Sandler LLP

(57) ABSTRACT

Terminating a process executing within a container is described. An access restriction applicable to the process is temporarily modified with a policy change that prevents creating new processes within the container. The policy change prevents operations that would allow processes within the container from performing a fork operation, or otherwise spawning new processes within the container. The policy change may be, for example, applied by means of a rule added or removed from an access restriction policy. While the processes are prevented from creating new processes, one specified process or all processes within the container are terminated. After termination of the process (es), the policy change can be reversed, allowing normal use of the container.

20 Claims, 5 Drawing Sheets

(56) References Cited

U.S. PATENT DOCUMENTS

| | | | | |
|---|---|---|---|---|
| 2004/0215950 | A1 | 10/2004 | Lindeman | |
| 2005/0149726 | A1* | 7/2005 | Joshi et al. | 713/164 |
| 2005/0240986 | A1 | 10/2005 | Yamamoto et al. | |
| 2005/0289150 | A1 | 12/2005 | Kudo | |
| 2006/0059539 | A1 | 3/2006 | Shashikumar et al. | |
| 2006/0085838 | A1 | 4/2006 | Samuelsson et al. | |
| 2006/0236370 | A1 | 10/2006 | John et al. | |
| 2007/0067843 | A1* | 3/2007 | Williamson | G06F 21/568 726/24 |
| 2008/0016339 | A1* | 1/2008 | Shukla | G06F 21/53 713/164 |
| 2008/0109876 | A1 | 5/2008 | Hitomi et al. | |
| 2008/0127292 | A1* | 5/2008 | Cooper | G06F 21/53 726/1 |
| 2008/0168530 | A1 | 7/2008 | Kuehr-McLaren et al. | |
| 2008/0244074 | A1* | 10/2008 | Baccas et al. | 709/227 |
| 2009/0049509 | A1 | 2/2009 | Chan et al. | |
| 2009/0125711 | A1 | 5/2009 | Schneider | |
| 2010/0131559 | A1 | 5/2010 | van Riel et al. | |

OTHER PUBLICATIONS

USPTO Final Office Action for U.S. Appl. No. 12/324,643, mailed Jan. 5, 2012.

USPTO Office Action for U.S. Appl. No. 12/324,643, mailed Jul. 14, 2011.

USPTO Notice of Allowance for U.S. Appl. No. 12/324,677, mailed Nov. 26, 2012.

USPTO Final Office Action for U.S. Appl. No. 12/324,677, mailed Mar. 30, 2012.

USPTO Office Action for U.S. Appl. No. 12/324,677, mailed Sep. 13, 2011.

* cited by examiner

RELIABLY TERMINATING PROCESSES IN A SYSTEM WITH CONFINED EXECUTION ENVIRONMENTS

RELATED APPLICATIONS

This Application is related to co-pending U.S. patent application Ser. No. 12/324,677, entitled, "Merging Mandatory Access Control (MAC) Policies in a System with Multiple Execution Containers," having common inventorship, and filed concurrently herewith and to co-pending U.S. patent application Ser. No. 12/324,463, entitled, "Isolating an Execution Container in a System with Mandatory Access Control (MAC)," having common inventorship, and filed concurrently herewith.

FIELD

The invention is generally related to process forking and process termination, and more particularly to terminating processes in a system with confined execution environments.

COPYRIGHT NOTICE/PERMISSION

At least a portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2008, Red Hat, Inc., All Rights Reserved.

BACKGROUND

Many computing systems allow the use of confined execution environments. A confined execution environment may also be considered a sub-execution environment, or an environment within a principal environment provided by an operating system under which all programs on the computing system execute. Confined execution environments may have particular rules associated with them, and/or they may be confined within a particular portion of a directory tree of the execution environment. Confined execution environments may simply be associated with a role on the main execution environment of the operating system.

In an environment where confined execution environments are used, it may be necessary to terminate, often referred to as "killing," a process or all processes within the confined execution environment. However, there may be a race condition that would allow a process to create a new process (fork) while old processes are found and terminated within the confined execution environment. Thus, a malicious process could be able to avoid termination until the confined execution environment is shut down completely, or the system is reset. Such a condition is often referred to as a "fork bomb," referring to the "explosion" of new processes forked within the confined environment. Such a condition can prevent normal execution a computing system, requiring a disruptive reset.

BRIEF DESCRIPTION OF THE DRAWINGS

The following description includes discussion of figures having illustrations given by way of example of implementations of embodiments of the invention. The drawings should be understood by way of example, and not by way of limitation.

DETAILED DESCRIPTION

Figure 1:
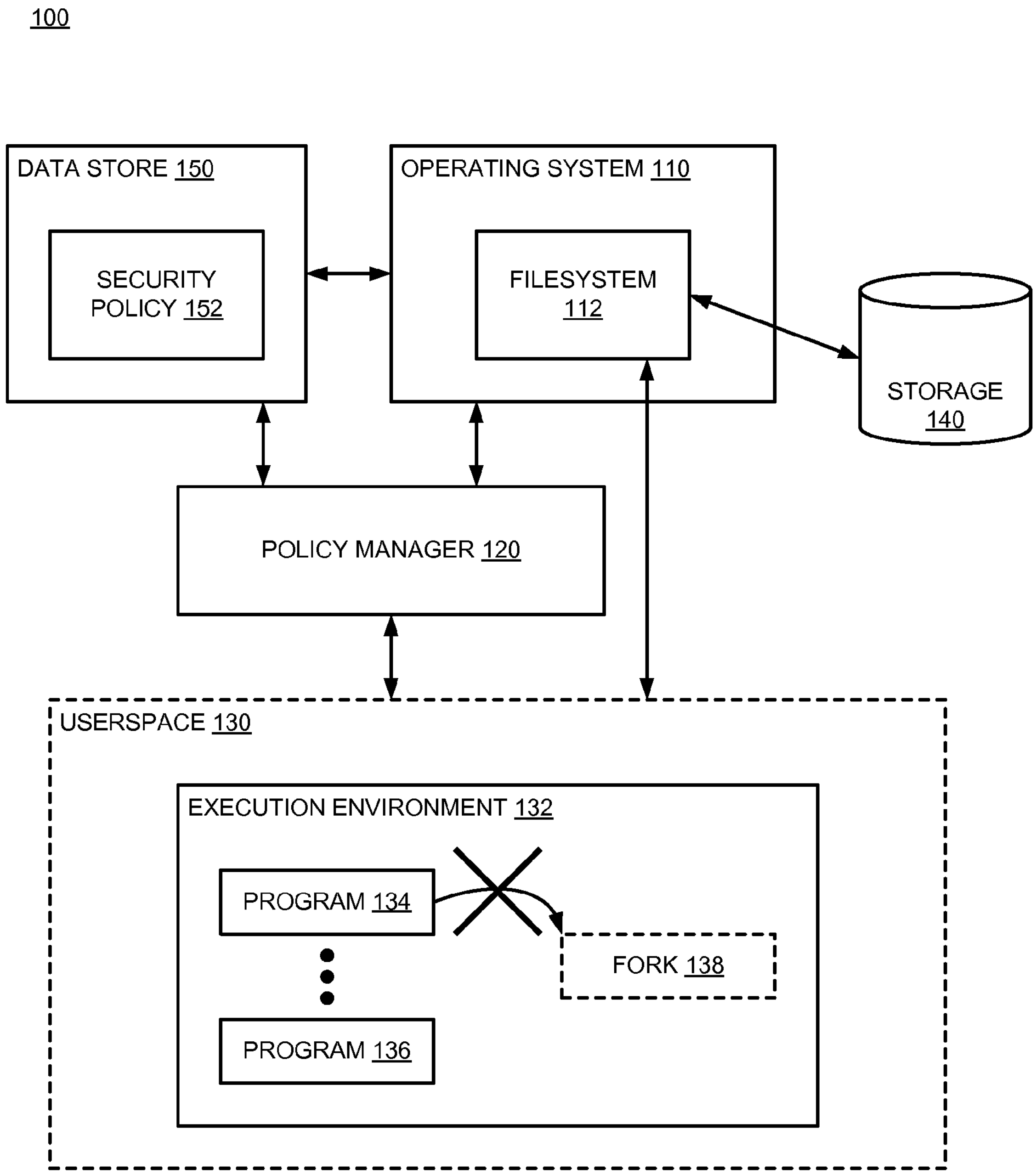
FIG. 1 is a block diagram of an embodiment of a system having execution environment in which process forking is restricted.

In one embodiment, mechanisms for terminating a process executing within a confined execution environment is described. An access restriction applicable to the process is temporarily modified with a policy change that prevents creating new processes within the execution environment or a container. The access restriction can be an access restriction in an operating system kernel or an access restriction in a security policy applicable to the particular execution environment. The policy change prevents operations that would allow processes within the execution environment from creating new processes, such as performing a fork operation, or otherwise spawning a new process. While the processes within the execution environment are prevented from creating new processes, one specified process or all processes within the execution environment are terminated (or killed). After termination of the process(es), the policy change can be reversed, allowing normal use of the execution environment. The policy change can be implemented, for example, by adding or removing a rule, and then performing the opposite operation (removing or adding, respectively) to allow normal operation.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as “sending”, “receiving”, “comparing”, “hashing”, “maintaining”, or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required operations of the method. Structure for a variety of these systems will appear as set forth in the description below. In addition, the present invention is not described with reference to any particular programming language. It will be appreciated that a variety of programming languages may be used to implement the teachings of the invention as described herein.

As mentioned above, a general problem with killing or terminating processes executing in a confined execution environment is that a race condition exists that allows a malicious process to create new processes while existing processes are found and terminated. The race condition can be overcome by revoking the ability for tasks in a particular security context to spawn new processes (e.g., fork). Revoking the ability to create new processes can be implemented as a standard operation when terminating a process within a confined execution environment, or may be executed in response to detecting a malicious process (e.g., detecting process corruption through known methods). In one embodiment, revoking the ability to create new processes is performed with a temporary policy change for a targeted execution environment. While the policy change is active, the system can then find and terminate processes in the targeted execution environment. Methods of finding and terminating processes are known. One or more specific processes may be targeted for termination, or all processes within the execution environment can be terminated. An example invocation of a mechanism to terminate all processes in a Linux implementation is:

killall–Z named_t;

After the process or processes are killed, processes within the execution environment can be re-enabled to create new tasks. For example, temporary policy changes can be deleted, reversed, or otherwise inactivated. Thus, an out of control group of programs can be reliably terminated and, at a later time, the programs can be restarted. It will be understood that in general, an access restriction policy can be temporarily modified to remove the ability for a process to create new tasks. As briefly mentioned above, the policy change can be effected by adding a rule to prevent the ability to create new tasks, or remove a rule that allows the ability to create new tasks. For simplicity in description herein, the temporary policy change will be described as “adding a temporary rule,” which is understood as illustrative only, and not limiting. The descriptions apply equally well to an implementation where a rule is temporarily removed or suspended.

In one embodiment, the confined execution environment or container is a path container. In one embodiment, the path container is managed by a policy manager. As used herein, a container refers to a confined environment or confined execution environment, where a process or program operating inside the container is restricted in what operations can be performed, and what data and services can be accessed. A path container can be considered a type of container, where the instance inside the container is a program, and the container limits the scope of operation of the instance to a particular sub-path of the OS’s execution environment (e.g., limited to within a certain sub-directory). As used herein a program may refer to a software application or a software component that executes in support of a software application. A “process” as used herein may refer to a program instance, or may refer to a component of an instance of a program (and thus there may be multiple processes that are part of a single program instance).

The processes are identifiable, having an identifier or a label. Such processes may also be referred to as labeled processes. A container can execute one or more program instances. There may be instances of various different programs. One example of a path container is chroot (or “change root”), which refers to an operation within a Unix/Linux environment that changes an apparent root as seen by program instances. Thus, the directory of the path container may be considered “root” for all processes or programs within the path container, but it may be several levels removed from system root, or absolute root. A directory logically above the path container may be referred to as a parent. As used herein, chroot is used as an example of a path container, but will be understood as only an example, and the concept of a path container includes chroot, as well as other mechanisms that can create a path container as described herein. Other types of containers or confined execution environments will also be understood. The mechanisms described herein with respect to termination of processes or application of temporary rules may be applied to any confined execution environment, and are not unique to path containers, although such environments provide one example of specific applications of the mechanisms.

In one embodiment, the process termination mechanisms as described herein are applied within a system that applies MAC security rules for multiple containers within the same system. MAC (mandatory access control) security is a mechanism employed by many operating systems. Examples of operating systems that employ MAC or similar techniques are SELinux, SECURE SOLARIS (of Sun Microsystems, Inc., of Santa Clara, Calif.), and WINDOWS VISTA (of Microsoft Corporation of Redmond, Wash.). Note that all copyrights used here and elsewhere herein are used solely for purposes of identification of a product. All marks are the property of their respective owners. In a MAC system or the equivalent, programs are executed under a security role, or other form of access permission identifier. For each role or group of roles, there are one or more rules that define what programs having the role are allowed to do. The rules can be referred to as permissions, access permissions, security policies, or some other label. The system generally applies the same rules to all programs having the same role. The general applicability of rules to programs of the same role is true even when the programs are executed in separate restricted execution environments.

In a MAC or similar access control environment, each program instance can be executed in a separate execution environment. A system may apply a modified instance of a general security policy to a particular container. An instance of the general security policy is generated for the specific container, which allows application of the security policy inside the container, while separating the path container from other path containers. The program instance inside the container sees management and application of the security policy as expected and not see anything outside the container, and entities (e.g., other programs executing on the operating system) that have higher permissions than the program instance can see the limitations of the programs inside the container. As used herein, reference to a program or process "seeing" something refers to the program being able to have knowledge or awareness of a particular circumstance within a system. The knowledge may come, for example, by performing an operation, making a request, or reading something from storage or memory.

Thus, in one embodiment, role transitioning can be defined in the security policy. If role transitioning is defined in the security policy, the security labels on files do not need to be changed inside the container. The process security contexts from the containers do not intersect with each other in the system (or, as referred to below, in the tree structure environment of the system), because each container can have its own security policy. When a new security policy is reloaded, the security policy may be intercepted by a system component (for example, a FUSE filesystem daemon) that integrates the container security policy into a system-wide security policy by a policy manager.

Note that the description of certain details with respect to MAC security and containers are to be understood only as examples, and not limiting. The implementation of the termination mechanisms described herein can be implemented with any type of security rules applicable to programs, and can be implemented with any type of labeled or identifiable program. Briefly, the termination mechanisms identify a program, and apply a temporary rule to the program, preventing the program from one or more actions that it might otherwise perform. The temporary rule can be lifted once the termination or another operation is performed.

FIG. 1 is a block diagram of an embodiment of a system having a path container and a policy manager to manage a restriction policy applicable to the path container. System 100 represents a computing system environment according to any embodiment described herein. System 100 includes operating system (OS) 110, and userspace 130. OS 110 can be any type of operating system, such as those mentioned above, that implements access controls on programs and/or otherwise enables a path container in userspace 130. User space 130 is an abstraction of an "area" within system 100 where user programs execute. It will be understood that the separation between OS 110 and the kernel or system-level operating environment and userspace 130 refers to a separation of privileges and permissions among the various processes that may run in each. Additionally, userspace 130 is where user-level programs are executed that are executed by or in response to user activity, whereas system-level processes are typically executed incident with the operation of the system, and may not require user input or user interaction in the same way as user-level processes.

System 100 includes data store 150, which represents a device that can store information. The device may include static (non-volatile) and/or dynamic (volatile) memory, and may include a database. Data store 150 includes security policy 152, which may correspond to a particular program role. As used herein, a role refers to a set of permissions or privileges associated with a program, and may be referred to as a security context. A role can also refer to an operation of the program and/or a use of resources by the program. A role can apply to a specific program, or with an entire execution environment (e.g., a path container). Security policy 152 is an example of any policy that affects the interaction and/or the operation of processes on system 100. Thus, the label "security" should not be read in a limiting sense, and the policy may be any type of policy. Specifically as shown, security policy 152 applies to a type of program, or a program executing with a particular role. OS 110 has access to data store 150 and information stored in it.

OS 110 includes filesystem 112, which represents an organization mechanism for files and data stored in storage 140. Storage 140 is a non-volatile storage, where values and information are retained even when power in system 100 is lost or interrupted, as contrasted to volatile storage such as main memory, which typically loses its value if power is interrupted. Filesystem 112 provides an interface between programs and processes executing in system 100 to access (read and/or write) data to storage 140. Filesystem 112 can be considered to provide a "view" of data to a program. Typically, the operation of filesystem 112 is understood by those skilled in the art as a program requesting an access service of filesystem 112, which then performs the service to provide the requested access.

System 100 also includes policy manager 120, which represents one or more components or modules within system 100 that manages security policies for userspace execution environments, such as execution environment 132. In one embodiment, policy manager 120 is implemented as, or includes, a daemon. A daemon is understood as a background process that performs a certain tasks or group of related tasks, and may also be referred to as a "service" in some contexts. In one embodiment, policy manager 120 manages security policies that are customized for particular path containers executing in userspace 130. In one embodiment, policy manager 120 executes in userspace 130, but could also operate in whole or in part with modules in kernel-space. Management of the security policies specific to certain path containers includes segregating security contexts of the path container(s) from the main system (the root environment), and merging individual or individualized security policies into a security policy loaded into a kernel of OS 110. When referring to a security policy being loaded into a kernel of the OS, it will be understood that the security policy is stored in, for example, main memory, and the address of the security policy is passed to the kernel. Thus, the kernel may know where the security policy is located, and may perform operations with reference to the security policy and its contents.

Additionally, it will be understood that reference herein to a security policy being loaded into the kernel is only an example, and should not be interpreted as limiting. In one embodiment, the policy can be loaded, stored, and enforced outside the kernel, for example, in the userspace. While it may be common in many operating systems for a kernel to implement the policies, not all services are necessarily all run in the kernel-space. For example, certain operating systems exist (such as so-called "micro kernel OS" or "hybrid OS") where some or many services in the system are executed in userspace. While the example of implementing policies is described herein as being performed in the kernel-space, it will be understood that the mechanisms described herein are generally applicable, and could be similarly performed in implementations that provide services in the userspace.

Userspace 130 includes execution environment 132, which represents a confined environment in which one or more programs, illustrated by programs 134-136, may execute. The confined environment may indicate that certain limits on operation are applicable to the programs, or that the programs have a particular role. The programs may have various roles, and multiple programs may have the same role.

In one embodiment, system 100 (e.g., via policy manager 120) applies a rule to limit program 134 from forking. Fork 138 represents an instance of program 134 or another process that is initiated by program 134. It may be desirable to generally allow program 134 to generate fork 138, and thus, forking may generally be permitted within execution environment 132. However, under certain circumstances, the ability to fork may be restricted by application of a temporary rule. Assume the temporary rule is meant to apply to program 134. The temporary rule may apply to all programs having the same role as program 134. The temporary rule may apply to all programs executing within execution environment 132. Alternatively, the temporary rule may apply globally across all programs in userspace 130 or in system 100.

Note that there is depicted a data store, which represents a memory or storage device in which various items may be stored. In the description of the remainder of the figures, security policies may be depicted as being "within" a kernel, or a policy manager. It will be understood that such depictions are representative, and values representing the security policies are stored somewhere in physical memory, and are "loaded" or known to the kernel or the policy manager. Thus, for simplicity in depicting and describing the concepts herein, the remainder of the description does not explicitly show the data store or the physical location of the components stored in storage/memory devices.

Security rules, whether temporary or otherwise, can be implemented as permission-based mechanisms, or exception-based mechanisms. A permission-based rule is a rule that indicates what is allowed. Implicitly in a permission-based system, whatever is not explicitly allowed may be disallowed. An exception-based system may be the converse, where operations are generally allowed, unless specified otherwise in the rules. MAC systems implemented in Linux platforms are generally permission-based, permitting only what is specifically allowed in the rules, and denying all other operations.

Figure 2:
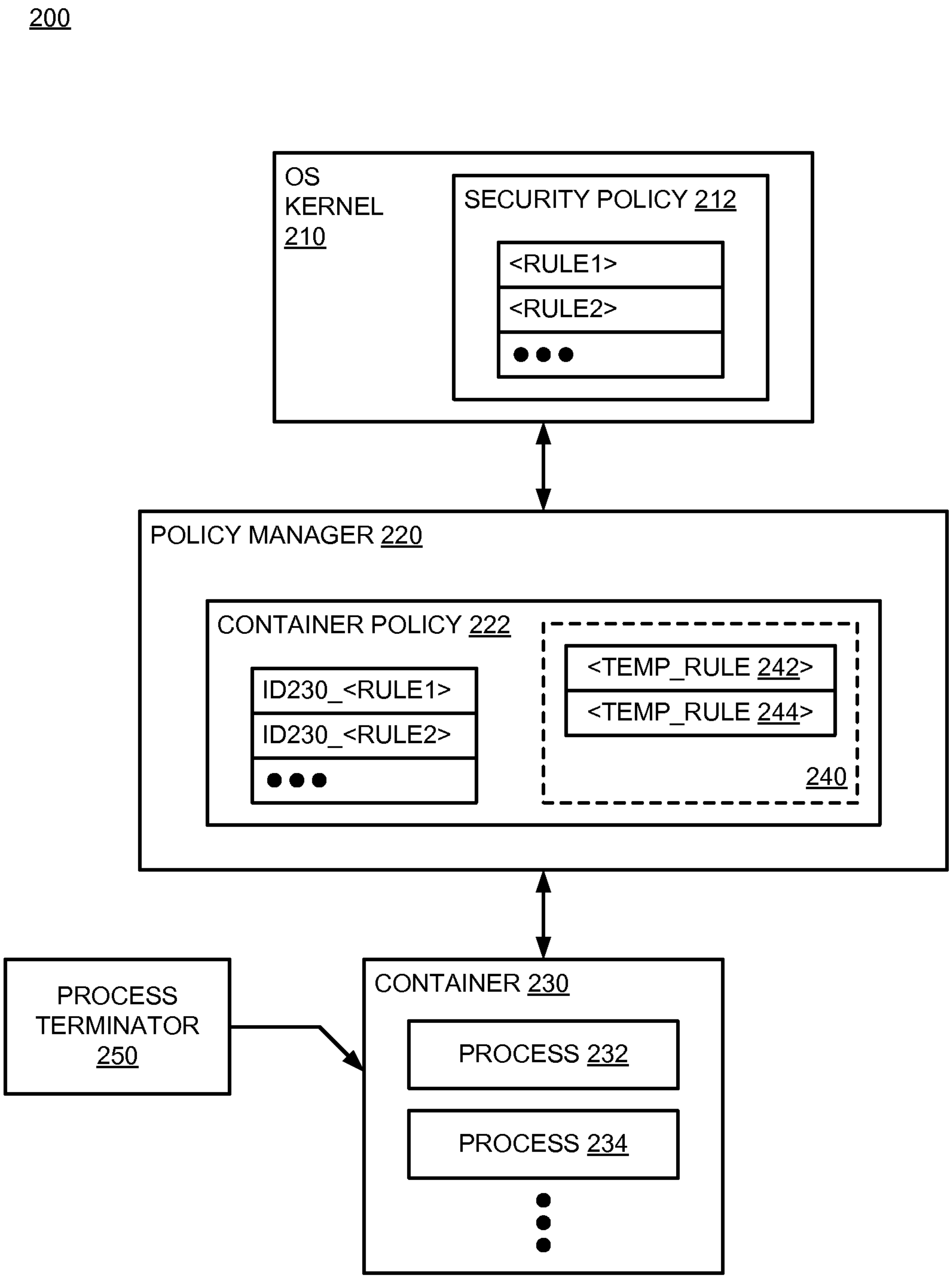
FIG. 2 is a block diagram of an embodiment of a system that temporarily limits operations within a path container.

FIG. 2 is a block diagram of an embodiment of a system that temporarily limits operations within a container. System 200 includes OS kernel 210, which represents a kernel in the operating system of system 200 that executes operations related to system security and/or interaction of processes within system 200. OS kernel 210 includes security policy 212 with one or more rules. Assume for purposes of description that security policy 212 applies to container 230, which is an execution environment executed in userspace of system 200. Container 230 includes one or more processes, 232, 234, etc., which are constrained in operation by security policy 212 applicable to container 230.

In one embodiment, policy manager 220 generates and stores (e.g., in volatile memory, or in static memory), container policy 222, which includes the rules of security policy 212 as specifically applied to container 230. Additionally, in one embodiment, container policy 222 includes temporary rules 240. Temporary rules 240 may take the same form as the other rules in container policy 222, and apply to the processes of container 230.

As discussed above, in one embodiment, a process may be out of control, which may be indicated, for example, by an excessive use of and/or request for system resources. Some processes may be configured to spawn new processes when the original process is attempted to be killed or terminated. Thus, process terminator 250 may be a system module that identifies and kills processes in system 200. However, if, for example, process 232 is out of control and malicious, it may spawn a new process within container 230 prior to being terminated. The new process may do likewise. Thus, process terminator 250 may be unable to stop the runaway processes of container 230.

The application of temporary rules 240 can enable process terminator 250 to kill the processes in container 230. Temporary rules 240 may include one or more rules that prevent the processes within container 230 from creating any new processes, whether by forking, spawning, or other process creation/generation mechanisms. While temporary rules 240 are applicable, process terminator 250 can effectively find and terminate target processes. It may be common for process terminator 250 to kill all processes within container 230. However, it is possible to individually identify and kill processes in container 230.

Once the target process or processes are killed, temporary rules 240 can be deactivated. In one embodiment, temporary rules 240 can exist within container policy 222 at all times, or be created in container policy 222 upon detection of a runaway process in container 230. However, temporary rules 240 may exist without being applied. Or, the rules could exist and only be invoked under the circumstance of trying to kill processes within container 230. The rules could be flagged as applicable and non-applicable for use in killing processes, or they can be generated and deleted whenever needed. In one embodiment, temporary rules 240 are only applied when attempting to kill multiple processes, which is when a race condition could exist that may allow a process targeted for termination may spawn a new process prior to being terminated.

Figure 3:
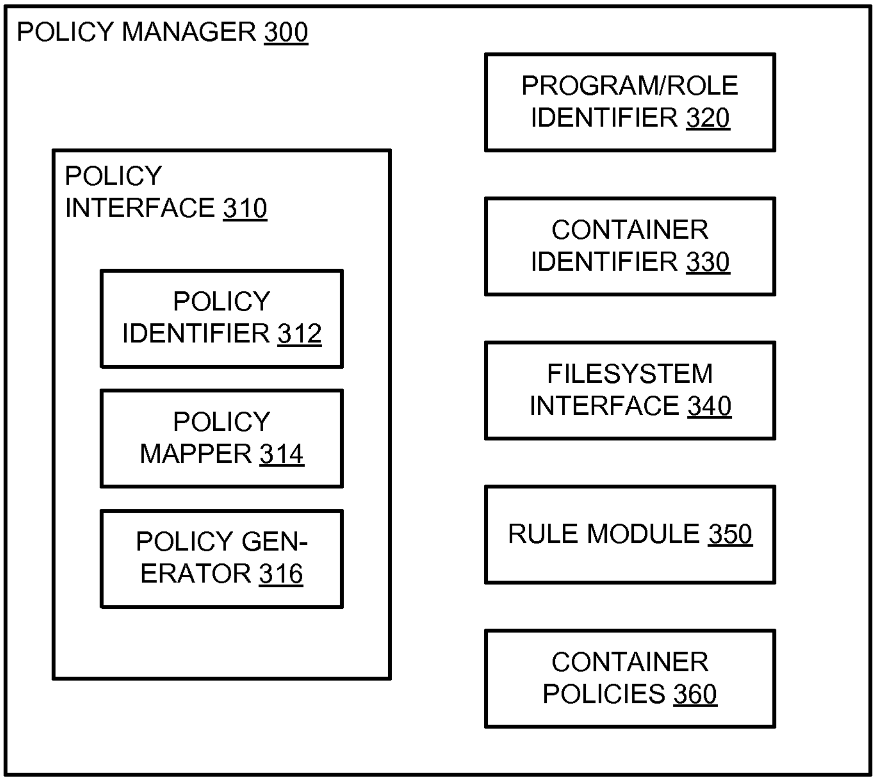
FIG. 3 is a block diagram of an embodiment of a policy manager that manages security policies.

FIG. 3 is a block diagram of an embodiment of a policy manager that manages security policies for containers or execution environments. Policy manager 300 represents a policy manager according to any embodiment described herein. In general, policy manager 300 manages individual security policies as applied to particular containers within a computing system (a host system). In one embodiment, policy manager 300 creates policies individual to target path containers. Policy manager 300 may include kernel-level interfaces and userspace interfaces. The components of policy manager 300 are intended as examples, and are not to be understood as limiting. A policy manager could be implemented with more, fewer, and/or different components than those shown. The components may exist as standard commands or operations within an execution environment, or they could be customized modules, or a combination of both.

Policy manager 300 includes policy interface 310 that interfaces the policy manager with the security policies in the host system. The policies that are interfaced include the general or system-level policies from which policies are created for individual containers, as well as the policies for the individual containers. Policy interface 310 includes policy interface 312, which enables policy manager 300 to identify or determine what policy applies to a program. A program has an associated policy based on the type of the program, the security context of the program, or other attributed associated with the program, depending on the implementation. Policy interface 312 can read or obtain the information that indicates the policy, and match it to the security policies at the system level. A security policy specific to a container is generated from the system-level security policies. The policy specific to a container can then be applied to each program and process running in the container.

Policy interface 310 includes policy mapper 314, which enables policy manager 300 to associate policies specific to particular containers to system-level security policies. Thus, policies are applied consistently throughout the system as required by typical MAC-based systems, but allows logical separation of the security policies. The logical separation of the policies allows the containers to be separate from each other, even if the same system-level security policy applies to each container.

Policy interface 310 includes policy generator 316, which enables policy manager 300 to create and modify copies of system-level security policies. Thus, policy manager 300 can generate a policy and associate it with a container. Alternatively, the system kernel could generate the policies. Policy manager 300 would generally associate the copies of the policies with specific path containers.

Policy manager also includes program/role identifier 320, which enables policy manager 300 to identify one or more programs or processes within a particular path container and identify a role associated with the identified path container. The role indicates what policy is applicable to the container, and may be used by policy interface 310 to identify the applicable policy.

Policy manager 300 also includes container identifier 330, which enables policy manager 300 to identify a container. Each path container includes an identifier (ID), which indicates the execution environment. In one embodiment, the container ID may be available only to processes having a higher security context, or a process further up the tree of execution environment, from the container.

Policy manager 300 includes filesystem interface 340, which represents one or more mechanisms through which policy manager 300 can access the system-level filesystem to access data and files for execution. In one embodiment, the containers are or create part of a filesystem having specific paths related to the containers. Filesystem interface 340 enables policy manager 300 to manage the access, for example, or multiple path containers to their localized filesystem path. Note that each container may have rules associated with it that can be designated, along with particular processes within the container, by the container ID. As far as the processes within the container are concerned, they operate as the root user, and can read and write to system-level portions of the filesystem. However, the restrictions of the rules specific to the containers may actually prevent such access to the processes of the containers.

Thus, filesystem interface 340 maps or translates the requests of the processes within a path container to the corresponding path in the actual, system-level filesystem, rather than the filesystem path as seen by the processes of the path container. For example, instead of accessing files in a security context <context>, the path containers may execute as though they are accessing files in <context>, and will see <context> from within their path containers, but they may actually be accessing files in the security context <context_path_container>, with the path container ID appended to the context. <context_path_container> can be stored and managed separately on the system-level filesystem from a security context <context_path_container2>. Both path containers would see <context> from the interfacing of policy manager 300.

In one embodiment, policy manager 300 includes rule module 350. Rule module 350 may be any of a number mechanisms. In one embodiment, rule module 350 enables policy manager 300 to create policies specific to a container, for example, by creating an instance of an applicable system-level policy, and modifying the rules based on the container ID. The policy may be applied to the container either by simply modifying the rules based on the container ID, or by the saving of the specific policy in the policy manager. The policy manager may include a mapping or association table, or some other mechanism to indicate what policy is associated with what container. In one embodiment, rule module 350 enables policy manager 300 to create a temporary rule in a system-level policy or a specific policy to restrict one or more operations within a target container.

In one embodiment, specific policies for each path container are stored at the policy manager. Thus, policy manager 300 may include container policies 360. Whether created by administrative interaction with the host system of policy manager 300, or whether policy manager 300 creates the specific policies, they may be stored locally for management. Policies may also be stored externally to policy manager 300, which can be accessed through, for example, policy interface 310.

Figure 4:
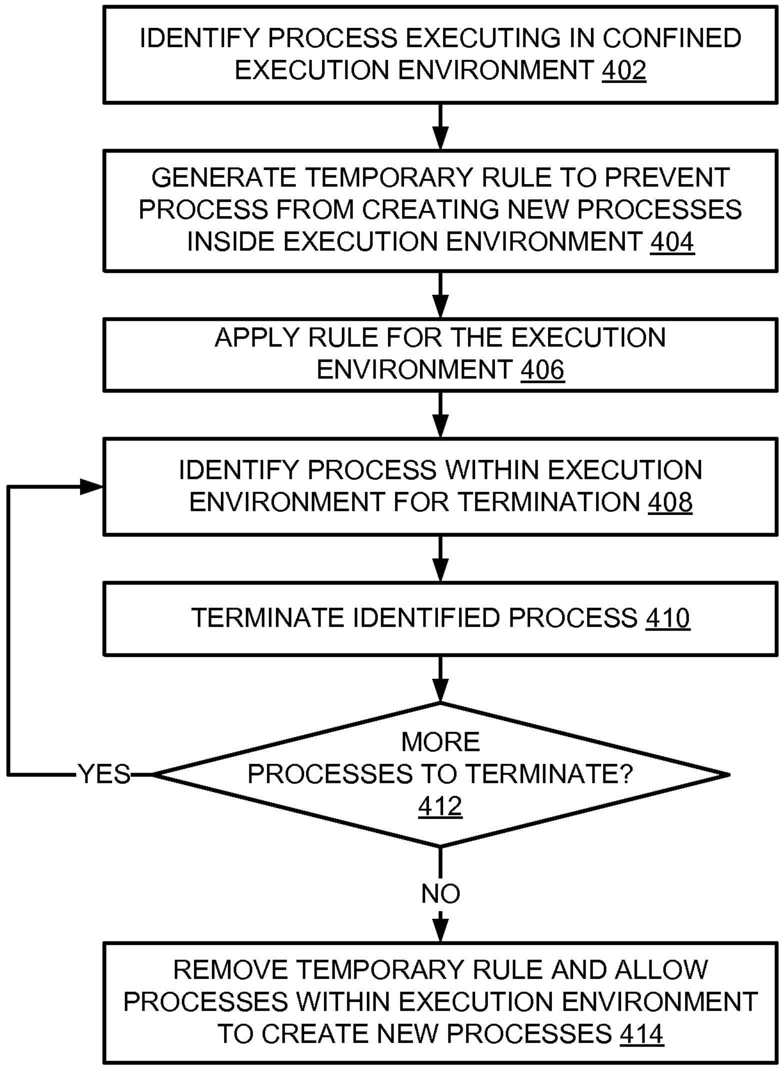
FIG. 4 is a flow diagram of an embodiment of a process for temporarily limiting operations within an execution environment.

FIG. 4 is a flow diagram of an embodiment of a process for temporarily limiting operations within a path container. The method or process may be performed by processing logic that may include hardware (e.g., circuitry, programmable logic, microcode, etc.), software (such as instructions run on a processing device), or a combination thereof.

A policy manager (e.g., 120, 220, 300) or an OS kernel (e.g., 110, 210) identifies a process (e.g., 134, 232) executing in a confined execution environment (e.g., 132, 230), 402. The policy manager or kernel may generically be referred to as an access control module; thus, "access control module" may refer to either or both of a policy manager or a kernel. The policy manager or kernel generates a temporary rule (e.g., 240) to prevent the identified process from creating new processes inside the execution environment, 404. The system architecture should likewise prevent the identified process from creating new processes outside the execution environment.

The policy manager applies the rule for the execution environment, 406. A process termination module (e.g., 250) identifies one or more processes within the execution environment for termination, 408. The module terminates the identified process(es), 410. In one embodiment, the module determines if there are more processes to terminate, 412. If there are more processes to terminate, 412, the module identifies and terminates those processes, 408, 410. If there are no more processes to terminate, 412, the policy manager removes the temporary rule and allows the processes within the execution environment to create new processes, 414.

Figure 5:
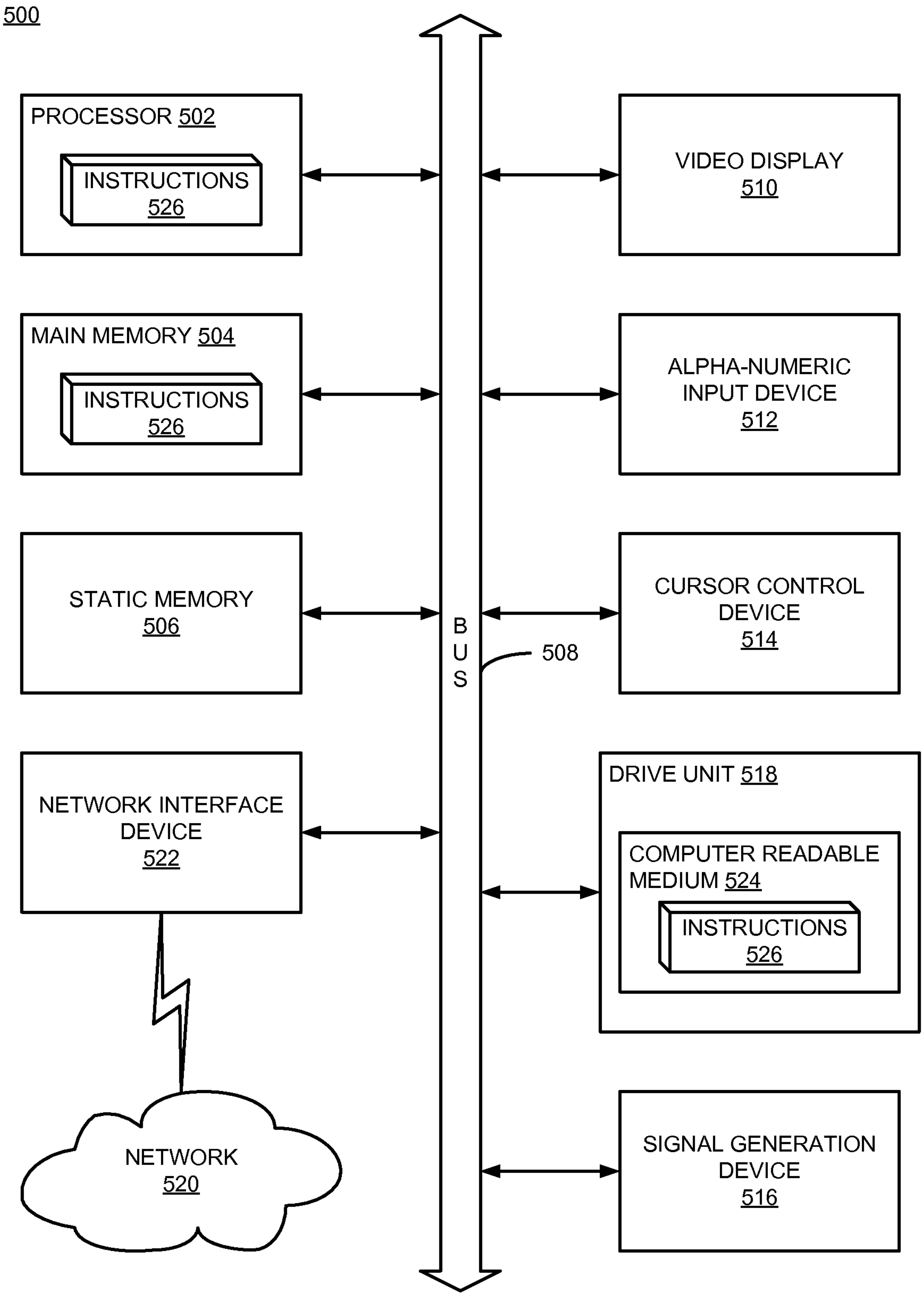
FIG. 5 is a block diagram of a computing device on which embodiments of the invention may be implemented.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 522 for performing the operations and steps discussed herein.

The computer system 500 may further include a network interface device 526. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 524 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 526.

While the machine-readable storage medium 524 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine readable storage medium" shall accordingly be taken to include, but not be limited to, solid-state memories, and optical and magnetic media.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:

identifying, by a processing device, a labeled process within a confined execution environment with an associated access restriction policy that defines permitted operations for processes within the confined execution environment, wherein a label of the labeled process identifies access permissions of the labeled process;

identifying other processes having a same label as the labeled process, wherein labels of the other processes identify the same access permissions of the labeled process;

identifying that a creating of the other processes having the same label identifying the same access permissions is exceeding a utilization of resources;

applying a temporary policy change by adding a new rule to the access restriction policy to prevent an ability to create new processes within the confined execution environment in response to the identification that the creating of the other processes having the same label is exceeding the utilization of resources and when a plurality of processes have created the other processes during an attempt to terminate the plurality of processes, and wherein the new rule is not added to the access restriction policy when a single process has created the other processes;

terminating, by the processing device, the identified labeled process and the other processes having the same label when the temporarily policy change is applied; and deactivating the temporary policy change by removing the new rule to restore the ability to create new processes after the terminating the identified labeled process and the other processes having the same label.

2. The method of claim 1, wherein identifying the labeled process further comprises identifying the associated access restriction policy for a process having a particular role.

3. The method of claim 1, wherein identifying the labeled process further comprises identifying the associated access restriction policy for a process executing under a chroot.

4. The method of claim 1, wherein identifying the labeled process comprises identifying a runaway process in which the labeled process spawns new processes prior to being terminated.

5. The method of claim 1, wherein applying the temporary rule comprises applying a temporary rule as part of an access restriction policy applicable to all processes within a system in which the identified labeled process executes.

6. The method of claim 1, wherein applying the temporary policy change comprises applying a temporary policy change applicable only to processes within the confined execution environment.

7. The method of claim 1, wherein applying the temporary policy change comprises generating a temporary rule in the access restriction policy, and wherein deactivating the temporary policy change comprises deleting the temporary rule from the access restriction policy.

8. The method of claim 1, wherein applying the temporary policy change to prevent creating new processes comprises applying the temporary policy change to prevent the identified labeled process from forking or spawning new processes.

9. The method of claim 1, wherein terminating the identified process comprises:

identifying all processes having the same label; and terminating all processes having the same label.

10. A non-transitory machine-readable storage medium comprising instructions that, when executed by a processing device, cause the processing device to:

identify, by the processing device, a labeled process within a confined execution environment with an associated access restriction policy that defines permitted operations for processes within the confined execution environment, wherein a label of the labeled process identifies access permissions of the labeled process;

identify other processes having a same label as the labeled process, wherein labels of the other processes identify the same access permissions of the labeled process;

identify that a creating of the other processes having the same label identifying the same access permissions is exceeding a utilization of resources;

apply, by the processing device, a temporary policy change by adding a new rule to the access restriction policy to prevent an ability to create new processes within the confined execution environment in response to the identification that the creating of the other processes having the same label is exceeding the utilization of resources and when a plurality of processes have created the other processes during an attempt to terminate the plurality of processes, and wherein the new rule is not added to the access restriction policy when a single process has created the other processes;

terminate, by the processing device, the identified labeled process and the other processes having the same label when the temporarily policy change is applied; and deactivate the temporary policy change by removing the new rule to restore the ability to create new processes after the terminating the identified labeled process and the other processes having the same label.

11. The non-transitory storage medium of claim 10, wherein to apply the temporary policy change, the processing device is further to apply a temporary policy change as part of an access restriction policy applicable to all processes within a system in which the identified labeled process executes.

12. The non-transitory storage medium of claim 10, wherein to apply the temporary policy change, the processing device is further to apply a temporary policy change applicable only to processes within the confined execution environment.

13. The non-transitory storage medium of claim 10, wherein to apply the temporary policy change, the processing device is further to generate a temporary rule in the access restriction policy, and wherein to deactivate the temporary policy change the processing device is further to delete the temporary rule from the access restriction policy.

14. The non-transitory storage medium of claim 10, wherein to terminate the identified process, the processing device is further to identify all processes having the same label and terminate all processes having the same label.

15. A system comprising:

a memory to store an access restriction policy associated with a confined execution environment where one or more labeled processes are to be executed, wherein the access restriction policy defines permitted operations for processes within the confined execution environment;

a processing device, operatively coupled with the memory, to:

identify the labeled process within the confined execution environment, wherein a label of the labeled process identifies access permissions of the labeled process;

identify other processes having a same label as the labeled process, wherein labels of the other processes identify the same access permissions of the labeled process;

identify that a creating of the other processes having the same label identifying the same access permissions by the labeled process is exceeding a utilization of resources;

apply a temporary policy change by adding a new rule in the access restriction policy to prevent an ability to create new processes within the confined execution environment in response to the identification that the creating of the other processes having the same label is exceeding the utilization of resources and when a plurality of processes have created the other processes during an attempt to terminate the plurality of processes, and wherein the new rule is not added to the access restriction policy when a single process has created the other processes;

terminate the identified labeled process and the other processes having the same label when the temporarily policy change is applied; and deactivate the temporary policy change by removing the new rule to restore the ability to create new processes after the identified labeled process and the other processes having the same label are terminated.

16. The system of claim 15, the processing device is further to identify the access restriction policy for a process executing under a path container.

17. The system of claim 15, the processing device is further to apply a temporary policy change as part of an access restriction policy applicable to all processes within the confined execution environment.

18. The system of claim 15, the processing device is further to apply a temporary policy change applicable only to processes within the confined execution environment.

19. The system of claim 15, the processing device is further to generate a temporary rule in the access restriction policy, and to delete the temporary rule from the access restriction policy.

20. The system of claim 15, the processing device is further to identify all processes having the same label, and terminate all processes having the same label.

* * * * *